May 15, 1951 F. D. SINGER 2,553,014
PHOTOGRAPHIC STRIP DEVELOPING APPARATUS
Filed Jan. 6, 1947 6 Sheets-Sheet 1
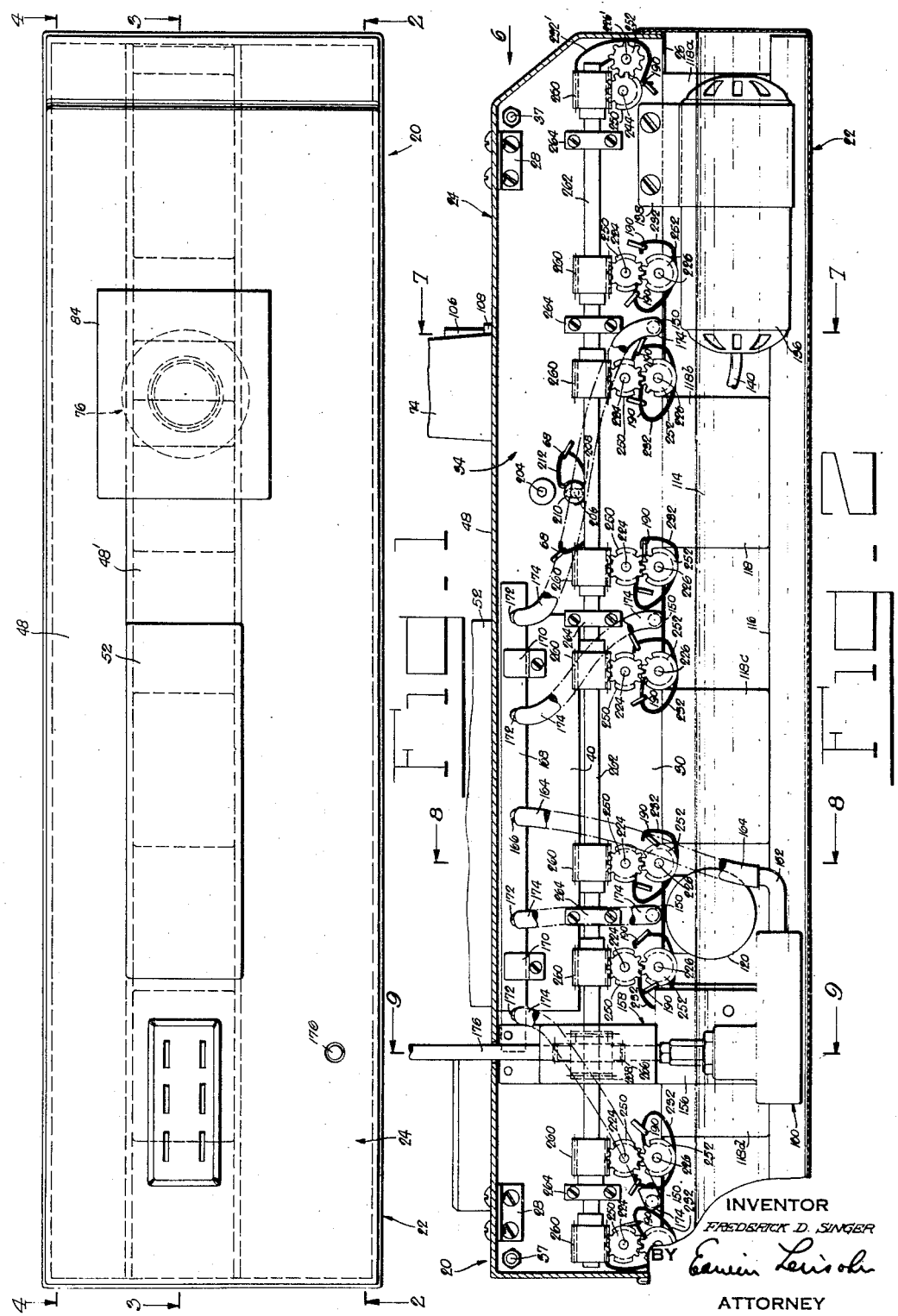
INVENTOR
FREDERICK D. SINGER
BY
ATTORNEY May 15, 1951 F. D. SINGER 2,553,014
PHOTOGRAPHIC STRIP DEVELOPING APPARATUS
Filed Jan. 6, 1947 6 Sheets-Sheet 2
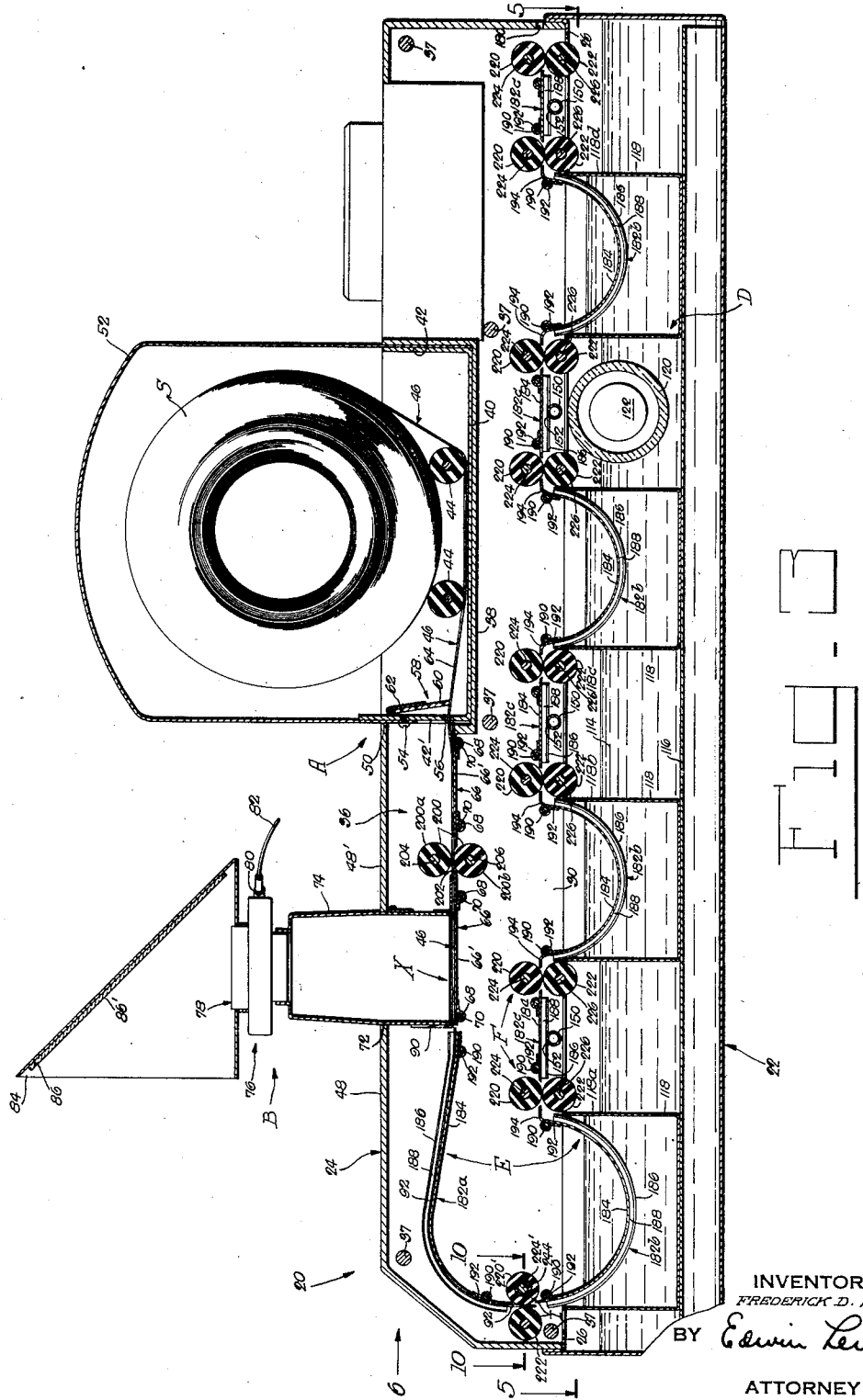
INVENTOR
*FREDERICK D. SINGER*
BY
ATTORNEY

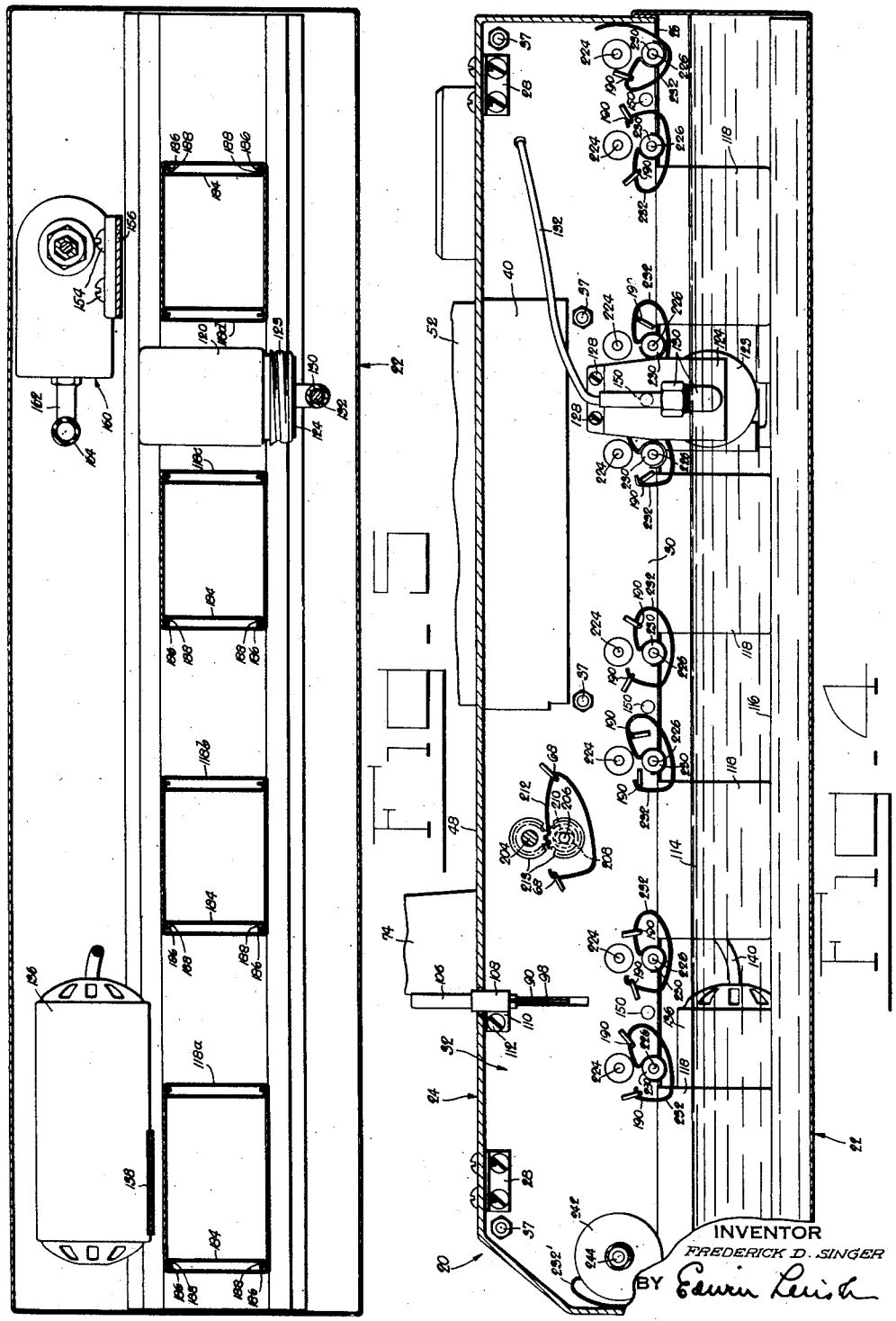

May 15, 1951  F. D. SINGER  2,553,014
PHOTOGRAPHIC STRIP DEVELOPING APPARATUS
Filed Jan. 6, 1947  6 Sheets-Sheet 4

INVENTOR
FREDERICK D. SINGER
BY
ATTORNEY

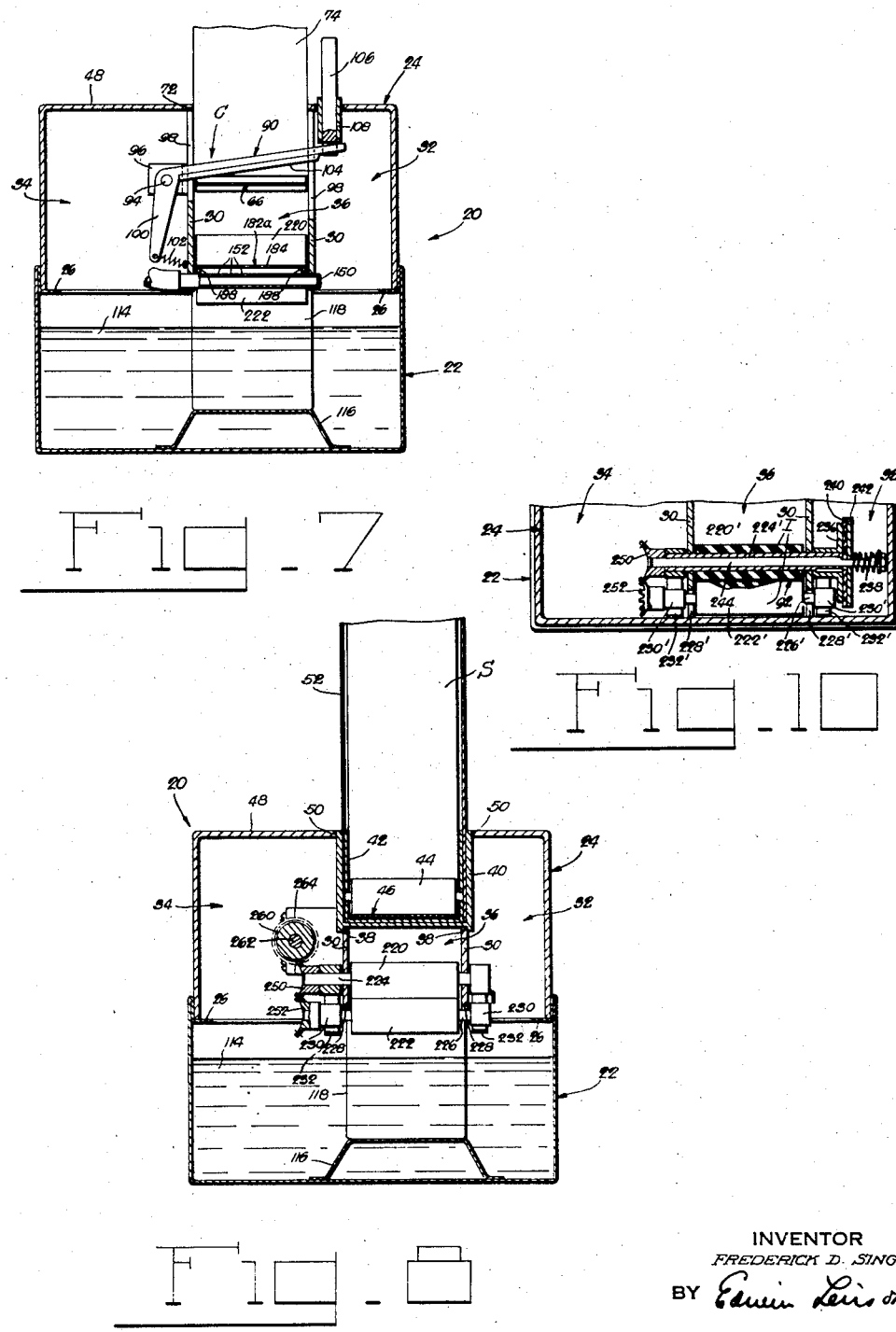

May 15, 1951  F. D. SINGER  2,553,014
PHOTOGRAPHIC STRIP DEVELOPING APPARATUS
Filed Jan. 6, 1947  6 Sheets-Sheet 6

INVENTOR
FREDERICK D. SINGER
BY Edwin Lewishr
ATTORNEY

Patented May 15, 1951

2,553,014

UNITED STATES PATENT OFFICE 2,553,014

PHOTOGRAPHIC STRIP DEVELOPING APPARATUS

Frederick D. Singer, Saginaw, Mich., assignor to International Mutoscope Corporation, Long Island City, N. Y., a corporation Application January 6, 1947, Serial No. 720,441

2 Claims. (Cl. 95—14)

1

This invention relates to photographic apparatus, and more particularly to apparatus of the type which are installed in public places and by which photographs may be taken and developed and complete positives delivered, without requiring the services of an attendant.

The photographic process usually carried out in apparatus of this general type is known as the re-exposure or re-development process in accordance with which the positive picture is produced directly on the exposed sensitized photographic material, and this process is carried out in the instant photographic apparatus which is of the specific type adapted for taking several successive pictures on a single strip of sensitized photographic material. Photographic apparatus of this specific type were known heretofore, but the development and re-development of the exposed sensitized material required either the services of an attendant on the premises, or some activity on the part of the customer. Hence, prior apparatus of this specific type were ill-suited for commercial installation in public places, since they were either too expensive to maintain if serviced by an attendant, or subject to rough and harmful handling and inefficient operation if serviced by the customers themselves.

It is the primary aim and object of the present invention to provide photographic apparatus of the specific type referred to which is free from the above objections and is particularly suited for installation in public places, by making provisions for automatically and efficiently developing and re-developing a strip of sensitized photographic material after the same has been wholly exposed.

It is another important object of the present invention to provide mechanism for feeding an exposed strip of the sensitized photographic material through successive baths of the various chemical solutions commonly used in the development and re-development process, without immersing the mechanism in any of these baths.

It is another important object of the present invention to adapt the feeding mechanism for power operation so that it may automatically assume the feed of the exposed strip of sensitized photographic material immediately after the same has been subjected to the last exposure, and feed it in a continuous motion through the successive chemical baths.

It is another important object of the present invention to provide a continuous track in which the exposed strip of the sensitized photographic material is fed in an undulating path through the successive chemical baths, so as to be completely immersed in the latter as it passes through the same, and to spray water on the exposed sensitized face of the guided strip to wash the same after subjection to each chemical solution, without permitting the water to flow to any of the chemical baths and dilute the same.

It is another important object of the present invention to embody the photographic apparatus in a condensed and self-contained unit which may hold an unusually large supply of sensitized paper, as well as chemical solutions and water, so as to be in operating condition for a long time before requiring the services of an attendant.

The above and other objects, features and advantages of this invention will be fully understood from the following description, reference being had to the accompanying illustrative drawings.

In the drawings:

Fig. 1 is a plan view, on a reduced scale, of photographic apparatus embodying the present invention;

Figs. 2, 3 and 4 are longitudinal sections through the apparatus, taken substantially on the lines 2—2, 3—3 and 4—4, respectively, of Fig. 1;

Figure 11:
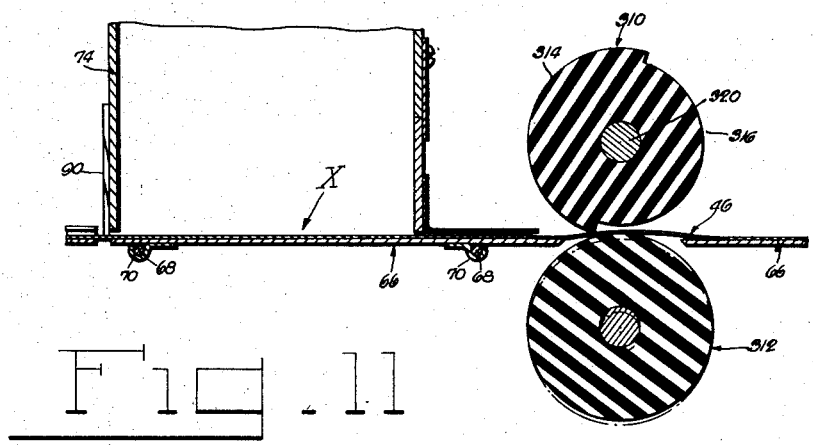
Figure 12:
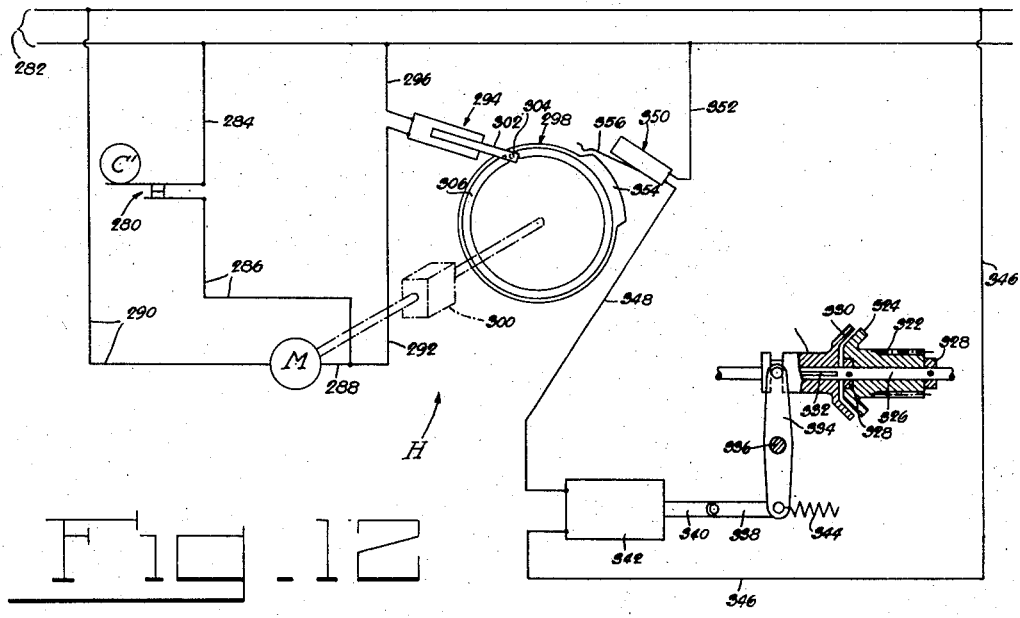

Figs. 7, 8 and 9 are transverse sections through the apparatus, taken substantially on the lines 7—7, 8—8 and 9—9, respectively, of Fig. 2;

Fig. 10 is a fragmentary section taken substantially on the line 10—10 of Fig. 3;

Fig. 11 is a fragmentary, enlarged section through certain modified equipment for the apparatus; and Fig. 12 is a wiring diagram disclosing the electrical control of the operation of the apparatus.

Briefly, the instant apparatus is provided with a large supply of sensitized photographic material in continuous band form, the leading end of which is brought into photographic alignment with a camera for a predetermined number of successive exposures of consecutive portions thereof. The exposed length or "strip" of photographic material is then severed from the supply band and fed in a suitable track through successive tanks containing the different chemical solutions for the development and re-development of the exposed strip, water being sprayed against the sensitized face of the strip after emerging from each chemical tank to wash the strip and prepare it for interaction with the chemical solution in the next tank, as well as give it a final wash after emerging from the last tank.

Referring now to Figs. 1 to 5, the present apparatus comprises a housing 20 which is formed by a basin 22 and a removable cover frame 24 thereover, the latter normally fitting into the top of the basin 22 and resting on inwardly turned flanges 26 on the latter. The fit of the cover frame 24 in the top of the basin 22 is preferably so accurate that outside light is excluded from the interior of the housing 20. Suitably installed in and on the housing 20 are the various operating provisions of the apparatus, which are as follows: an installation A for holding sensitized photographic supply material (Fig. 3); an exposure mechanism B (Fig. 3); a strip-severing device C (Fig. 7); developing and re-developing equipment D (Fig. 3); a strip track E (Fig. 3); a strip feed F (Fig. 3); a power drive G for the strip feed F (Fig. 9); and an electrical control H for the power drive G (Fig. 12).

*Installation A for holding sensitized photographic supply material*

Referring to Figs. 2, 3, 4 and 8, the cover frame 24 has secured thereto, by means of bolted brackets 28, longitudinal partitions 30 which divide the cover frame into side compartments 32 and 34 and a middle compartment 36. The partitions 30, which are preferably braced against each other by cross-ties or bars 37 (Figs. 3 and 4) are provided with laterally aligned cutouts 38 (Figs. 3 and 8) for the reception of a holding frame 40 for a receptacle 42 in which are journalled rollers 44 for rotatably supporting a supply roll S of the sensitized photographic band material 46. The top 48 of the cover frame 24 is apertured as at 50 so that the holding frame 40 may be admitted into the cover frame 24 from the top thereof. The receptacle 42 is of such dimensions as to have on all sides a slight clearance from the holding frame 40 into which the lower end of a cover 52 over the supply roll S is admitted, and in which the cover 52 is preferably removably secured to the receptacle 42 by a screw 54 (Fig. 3). A part 48' of the top 48 of the cover frame 24 adjacent the front wall 42' of the receptacle 42 is preferably removable for ready access to the screw 54 when the cover 52 has to be removed for replacement of an exhausted supply roll S of sensitized band material 46. The front wall 42' of the receptacle 42 is provided with an exit slot or gate 56 through which the supply band 46 passes from within the receptacle 42 to the outside thereof and to the exposure mechanism B. Preferably provided in the receptacle 42 is a light shield 58 (Fig. 3) which is in the form of a flap 60 of felt or the like, suitably mounted on a hinge 62 in the receptacle 42 and resting lightly on the sensitized face 64 of the supply band 46 in the immediate vicinity of the exit gate 56, so as to prevent any light from the exposure mechanism B to enter the receptacle 42 through the gate 56 in the latter and spoil the sensitized band material 46 which is exposed in the interior of the receptacle 42 and the cover 52 thereover.

Extending forwardly from the exit gate 56 in the receptacle 42 and in the middle compartment 36 of the cover frame 24 is a platform 66 (Fig. 3) over which the supply band 46 is guided to the exposure mechanism B. The platform 66 extends throughout the width of the middle compartment 36 in the cover frame 24, and is supported on transverse rods 68 which are conveniently anchored in the partitions 30 and preferably embraced by clamps 70 that are suitably secured to the platform 66.

*Exposure mechanism B*

Referring to Figs. 3 and 7, there is suitably secured to, and accurately fitted in an aperture 72 in the top 48 of, the cover frame 24 the housing 74 of a camera 76, having the usual lens assembly 78 and shutter mechanism 80, the latter to be operated in the present instance preferably manually by a cable release 82. Suitably fitted over the lens assembly 78 is a triangular hood 84 (Fig. 3) which contains a reflector 86, having a mirror surface 86' which is in optical registry with the camera lens and with the subject to be photographed in front of the apparatus, and reflects the subject's image upon the camera lens for the exposure of that portion of the supply band 46 which lies on the platform 66 within the confines of the camera housing 74, i. e., at the exposure station X.

*Strip severing device C*

Referring to Figs. 3 and 7, there is provided on the camera housing 74 at the forward end of the platform 66 a cutter 90 with which to sever from the supply band 46 a strip 92 (Fig. 3) of which a predetermined number of successive longitudinal portions (three, in the present instance) have been exposed by the camera 76 at the exposure station X. The cutter 90 is pivotally mounted at 94 on a bracket 96 on one of the partitions 30, and extends across the middle compartment 36 in the cover frame 24 and through slots 98 in the partitions 30 (Fig. 7). The cutter 90 is provided with a laterally extending arm 100 on which acts a spring 102 that normally urges the cutter 90 into the inoperative or retracted position shown in Fig. 7. The cutter 90 has a knife edge 104 which, on depression of the cutter, cooperates with the adjacent end of the platform 66 in shearing off or severing the strip 92 from the supply band 46, leaving the leading end of the latter at the exposure station X ready for an exposure. The cutter 90 is depressible from the outside of the housing 20 by a plunger 106 which is guided for vertical movement in a sleeve 108, provided by a bracket 110 which is mounted at 112 on one of the partitions 30 (see also Fig. 4). The lower end of the plunger 106 is bifurcated and straddles the adjacent end of the cutter 90 in the manner shown in Figs. 4 and 7.

*Developing and re-developing equipment D*

As shown in Figs. 3 and 9, for instance, the basin 22 serves as a reservoir for a supply of water 114 which is used for washing an exposed strip 92 after each subjection to a chemical solution. Suitably secured, as by welding, to the bottom of the basin 22 is a raised platform 116 on which are mounted in any suitable manner a series of longitudinally spaced tanks 118, adapted for the reception of the various chemical solutions used in the treatment of an exposed strip 92 in accordance with the development and re-development process. Thus tank 118a may contain developer, tank 118b may contain bleaching solution, tank 118c may contain clearing solution, and tank 118d may contain second developer. Hence, in conformity with the normal sequence of chemical treatment of exposed sensitized photographic material in the development and re-development process, an exposed strip 92 is passed successively through the tanks 118a, 118b, 118c, 118d for its development and re-development. Also in conformity with the development and re-development process, an exposed strip 92 thus chemically treated is also re-exposed between its subjection to the clearing solution and its subjection to the second developer. To this end, there is provided between the tanks 118c and 118d an immersed, transparent holder or container 120 for an electric light bulb 122, light from which re-exposes the exposed strip 92 while it passes over the transparent holder 120 in the course of its travel from tank 118c to tank 118d. The holder 120 is screwed with a water-tight fit into a cap 123 (Fig. 5) which is suitably carried by a bracket 124, mounted at 126 on one of the partitions 30 (Fig. 4). Emerging from the cap 123 and bracket 124 is a water-tight conduit 130 which extends above the level of the water 114 in the basin 22, and serves to lead an electric wire 132 to the socket (not shown) for the second-exposure bulb 122 in the holder 120.

For most efficient development and re-development of an exposed strip 92, the water 114 in the basin 22, as well as the various chemical solutions in the tanks 118, are heated to a certain degree. To this end, there is immersed in the water supply 114 in the basin 22 an electrical heater 136 (Fig. 2) which is mounted on one of the partitions 30 through intermediation of a clamp 138. Extending from the heater 136 is a water-proof electric cable 140 for carrying electric current to the heater.

Extending across the middle compartment 36 in the cover frame 24 between each pair of consecutive tanks 118 and behind the last tank 118d are spray tubes 150 (Figs. 3 and 7), having perforations 152 through which water is forced against an exposed strip 92 while the same travels through the track E to be described. Water from the basin 22 is supplied to the spray tubes 150 in the following manner. Mounted at 154 on a depending web 156 of a bracket 158 in the side compartment 34 of the cover frame 24 is a pump 160 (Fig. 9), which is immersed in the water supply 114 and has an inlet (not shown) and an outlet 162 (Fig. 2) which is connected through a flexible hose 164 with an inlet 166 to a manifold 168, secured to one of the partitions 30 by suitable clamps 170. The manifold 168 has a plurality of outlet branches 172 which communicate with the spray tubes 150, respectively, through flexible hose connections 174, respectively. The pump 160 is provided with a drive shaft 176 which is operated in a manner to be described hereinafter. When the pump 160 operates, water from the basin 22 is supplied to the manifold 168 from where it is distributed through the hose connections 174 to the several spray tubes 150, the sprayed water returning to the water supply in the basin. Hence, the present apparatus has a circulating water spray system. The water supply in the basin 22 may, from time to time, be replaced with clean water, and the different chemical solutions in the tanks 118 may also be replaced from time to time with fresh chemical solutions, so as to maintain the development and re-development of exposed strips 92 efficient at all times.

*Strip track E*

The track E leads a severed exposed strip 92 away from the cutter 90 to the front of the apparatus, and then rearwardly through the several chemical tanks 118 to a discharge slot or gate 180 in the rear of the cover frame 24 through which the strip is, in its finished state, delivered to the customer. The track E is, in the present instance, composed of several separate sections 182, each of which extends across the full width of the middle compartment 36 in the cover frame 24, and is in the form of a web 184 of sheet metal or the like, having its opposite side borders 186 turned inwardly (Figs. 5, 7 and 9) to form opposite channels 188 in which the opposite side margins of an exposed strip 92 are received (Fig. 3). It appears from Fig. 3 that the forward run or section 182a of the track E is inverted to the remainder of the track, so that a strip 92 in the forward section 182a lies on the web 184 thereof, while the same strip is, on its advance through the remainder of the track, supported solely in the opposite channels 188 of the remaining or "return" track sections 182, with the sensitized face 64 of the strip turned away from the webs 184 of these "return" track sections and directly exposed to the different chemical solutions in the tanks 118. The "return" sections 182 of the track E are composed of curved sections 182b and straight sections 182c which are arranged alternately in the fashion shown in Fig. 3, so that each curved track section 182b is partly immersed in the chemical solution in a tank 118, while the straight track sections 182c form continuations of the curved track sections 182b and extend between consecutive tanks 118 as well as from the last tank 118d to the discharge gate 180 in the cover frame 24. The various track sections 182 are, like the platform 66, supported on transverse rods 190 in the middle compartment 36 of the cover frame 24, and are preferably held thereon by suitable clamps 192 which are welded or otherwise secured to the various track sections 182. The forward section 182a is in alignment with the platform 66 so as to receive the supply band 46 as it is fed beyond the exposure station X. As shown in Fig. 3, the forward section 182a of the track also cooperates with the adjacent curved track section 182b to reverse the motion of the strip 92, after its severance from the supply band 46, for its passage through the chemical tanks 118 and to the discharge gate 180 at the rear of the apparatus. It will also be noticed in Fig. 3 that the ends of the webs 184 of the curved track sections 182b are reversely curved as at 194 in order gradually to guide a strip 92 from any one of the curved track sections 182b to the continuing straight section 182c, and vice versa.

Since the sensitized face 64 of an exposed strip 92 in any one of the straight track sections 182c is turned toward the adjacent spray tube 150, water issuing from the latter impinges directly on the sensitized face 64 of the strip and then returns to the water supply 114 in the basin 22.

*Strip feed F*

Figure 6:
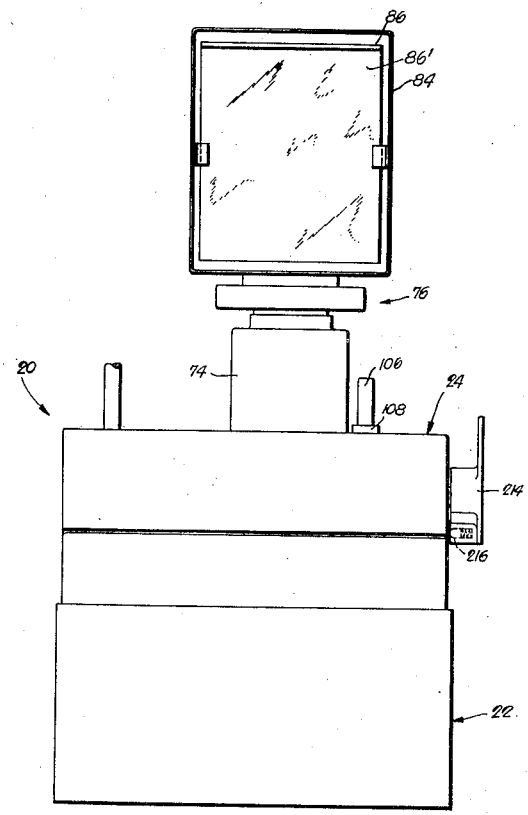
Fig. 6 is a front elevation of the apparatus as viewed in the direction of the arrow 6 in Figs. 2 and 3.
Figure 5:
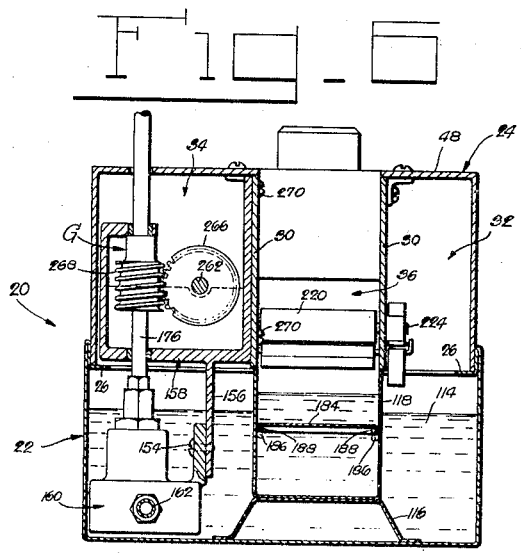
Fig. 5 is a horizontal section through the apparatus, taken on the line 5—5 of Fig. 3.

The sensitized supply band 46 is, in the present apparatus, fed intermittently from the supply roll S to and beyond the exposure station X, before a strip 92 is severed therefrom and fed in a continuous motion through the track E. The intermittent feed of the supply band 46 in steps equal to the length of the latter which is exposed for each picture, is accomplished by cooperating feed rolls 200 (Fig. 3) which operate in a gap 202 between the separate sections 66' that constitute the platform 66. The feed rolls 200, which are preferably made of rubber, are mounted on shafts 204 and 206 respectively, of which shaft 204 is suitably journalled in the partitions 30, while shaft 206 extends through oblong slots 208 in the partitions 30 (Figs. 2 and 4) and is journalled in bushings 210, suitably carried by leaf springs 212 in the side compartments 32 and 34 of the cover frame 24. The leaf springs 212 are so shaped, and so anchored on the adjacent ends of the platform-supporting rods 68 (Figs. 2 and 4), as to urge the lower roll 200b into cooperative engagement with its companion roll 200a. The ends of the shafts 204 and 206 which extend into the side compartment 32 of the cover frame 24 carry gears 213 (Fig. 4) which are in permanent mesh with each other. The shaft 204 extends with one end to the outside of the cover frame 24 and there carries a handle 214 (Fig. 6) with which to turn the driving feed roll 200a and thereby advance the supply band 46 toward and beyond the exposure station X. In the present instance, the diameters of the identical feed rolls 200 are selected so as to require one complete revolution for feeding the correct length of the supply band 46 for one exposure. In order that a customer may have a ready indication when to stop turning the handle 214 for advancing the supply band 46 for the next exposure, handle 214 is preferably provided with a spring-urged detent 216 (Fig. 6) which registers with a depression (not shown) in the cover frame 24 after each complete revolution of the handle 214.

The continuous feed of an exposed strip 92 through the track E is accomplished by spaced pairs of cooperating rolls 220 and 222 (Fig. 3). The first pair I of feed rolls 220, 222 is interposed between the forward section 182a and the continuing, first return section 182b of the track E, while the remaining pairs of feed rolls 220, 222 are interposed between the consecutive return sections 182b and 182c, and also between the last return section 182c and the discharge gate 180 at the rear of the cover frame 24. The "driving" feed rolls 220 of all pairs, except pair I, are mounted on drive shafts 224 which are journalled in the partitions 30 in the manner shown in Fig. 8. The cooperating "driven" feed rolls 222 are mounted on shafts 226 which extend through clearance slots 228 in the partitions 30 (Fig. 8) and are journalled in bushings 230 which are suitably carried by leaf springs 232 in the side compartments 32 and 34, respectively, of the cover frame 24 (see also Figs. 2 and 4). The springs 232 are so shaped, and so anchored on the track-supporting rods 190, as to urge their respective feed rolls 222 into driving engagement with the companion rolls 220. All the feed rolls 220 and 222 are preferably made of rubber or a like material which does not readily mar the strip 92, and particularly the sensitized face 64 thereof.

The mounting shaft for the driving roll 220' of the first pair I of feed rolls is in form of a sleeve 224' (Fig. 10), which is journalled with its ends in the partitions 30 and carries at one end a friction disk 236 against which is urged by a spring 238 the friction lining 240 on a companion disk 242 which is mounted for axial sliding movement on a drive shaft 244, journalled in the sleeve 224'. Hence, the disks 236, 242 constitute a friction coupling between the drive shaft 244 and the feed roll 220'. The driven roll 222' of the first pair I of feed rolls is mounted on a shaft 226' which extends through clearance slots 228' in the partitions 30 (Fig. 10), and is journalled in bushings 230', suitably carried by leaf springs 232' which are so mounted as to urge roll 222' into cooperative engagement with its companion roll 220'.

The ends of the shafts 224 and 244 which extend into the side compartment 34 of the cover frame 24, carry identical gears 250 which are in permanent mesh with identical gears 252 on the adjacent ends of the respective countershafts 226 and 226' which carry the driven rolls 222 and 222', respectively.

The several pairs of cooperating feed rolls 220 and 222, including the pair I, are driven by worms 260 on a longitudinal shaft 262 (Fig. 2). The worms 260 are in permanent mesh with the gears 250, respectively, the latter being of the dished type shown in Fig. 8 suitable as combination spur and worm gears. The shaft 262 is journalled in spaced bearing brackets 264 on one of the partitions 30, and carries a further worm gear 266 (see also Fig. 9) which is in permanent mesh with a worm 268 on the pump shaft 176, the latter being journalled in the previously mentioned bracket 158 which is suitably mounted at 270 on the adjacent partition 30.

*Power drive G*

The shaft 176 is suitably drivingly connected with any suitable prime mover (not shown) which may be a combined electric motor and reduction gearing on top of the housing 20. The control over the operation of the prime mover is described hereinafter, but it may be stated in advance that the feed rolls 220, 222 are driven prior to the severance of an exposed strip 92 from the supply band 46 so that the strip may be fed through the track E immediately on its severance from the supply band 46. To this end, the first pair I of feed rolls 220', 222' is so disposed (Fig. 3) that the leading end of the non-severed strip 92 will enter the bite of the feed rolls 220', 222' toward the end of the last intermittent feed of the supply band 46 in an operating cycle of the apparatus, but these feed rolls, though then rotating, will advance the strip 92 only after the same has been severed from the supply band 46, the friction coupling 236, 242 (Fig. 10) meanwhile taking up the lost motion between the roll 220' and the drive shaft 244 therefor. Hence, after an exposed sensitized strip 92 has been severed from the supply band 46, the severed strip is immediately and automatically fed in a continuous motion through the track E, being therein subjected to the action of the several chemical solutions in the tanks 118, as well as to the intermittent and final water sprays from the tubes 150. In order to wash the sensitized face 64 of a strip 92 most efficiently, the jet openings 152 in the spray tubes 150 are so arranged (Fig. 3) that water issuing therefrom flows counter to the feeding direction of the strip 92. In this way, the water is also less apt to be carried by the moving strip 92 into the tanks 118 and dilute the chemical solutions therein, as will be readily understood.

*Electrical control H*

Referring to Fig. 12, there is shown a wiring diagram which is suitable for controlling the operation of the prime mover or electric motor M of the present apparatus. In the instant control, the operation of the motor M may be started by depositing in the apparatus a coin C' which closes a normally open switch 280 in a starting circuit for the motor M, comprising, any suitable power line 282, a lead 284, switch 280, leads 286 and 288, motor M, and a lead 290. Hence, closure of the starting switch 280 by a coin C' results in closure of the described starting circuit and operation of the motor M. Suitable electrical mechanism (not shown) may also be provided which normally prevents the operation of the shutter release, but which will permit its operation on closure of the coin switch 280 for the requisite number of exposures in an operating cycle of the apparatus. However, since in any conventional coin mechanism (not shown), that may be employed in the present apparatus, an inserted coin C' will close switch 280 only momentarily on its passage to a coin box, a holding circuit for the motor M is provided which will be closed for the continued operation of the motor M after the described starting circuit is opened. The holding circuit for the motor M comprises the power line 282, lead 290, motor M, lead 288, a lead 292, a normally open snap switch 294, and a lead 296. The "holding" switch 294 is under the control of a cam disk 298 which is driven from the motor M through intermediation of a suitable reduction gearing 300, so that the cam disk 298 makes one complete revolution during an operating cycle of the apparatus. While the apparatus is inoperative, the cam disk 298 assumes the "home" position shown in Fig. 12, in which the actuating blade 302 of the holding switch 294 projects into a short gap 304 in an otherwise continuous, arcuate cam track 306 on the cam disk 298, permitting thereby the holding switch 294 to assume its normally open position. When a coin C' is inserted in the apparatus and the operation of the motor is started in consequence of the momentary closure of the described starting circuit, the cam disk 298 is sufficiently turned to bring the cam track 306 into operative engagement with the blade 302 of the holding switch 294 and close the latter before the starting circuit is reopened, closing thereby the described holding circuit so that the operation of the motor M is continuous until the operating cycle of the apparatus is concluded, i. e., when the cam disk 298 has completed one complete revolution and the gap 304 in the cam track 306 permits switch 294 to return to its normally open position.

While the apparatus hereinbefore described relies on a manual intermittent feed of the supply band 46 to the exposure station X, the instant invention also contemplates a power-driven intermittent feed for the supply band 46 which is rendered operative on deposition of a coin C' in the apparatus. To this end, the driving feed roll 200a in Fig. 3 may be replaced by a feed roll 310 of the type shown in Fig. 11, which cooperates with a feed roll 312 that may be like the driven roll 200b in Fig. 3. More particularly, the driving feed roll 310 has an offset periphery to provide thereon a raised shoulder 314 and a depression 316. It appears from Fig. 11 that the raised shoulder 314 on the feed roll 310 cooperates with the companion roll 312 to feed the supply band 46 to the exposure station X during a part only of one revolution of the roll 310. In the present instance, the raised shoulder 314 occupies one half of the periphery of the roll 310, so that the supply band 46 is fed during one half revolution of the roll 310, and remains motionless during the remaining half revolution of the roll 310 for an exposure.

The provision of the feed roll 310 with its stepped periphery adapts the intermittent feed for power operation from the motor M. To this end, the shaft 320, which carries feed roll 310, preferably also carries a gear (not shown) which may be of the same type as the gears 250 (Fig. 2) and be in permanent mesh with a worm gear 322 (Fig. 12) that may be formed integrally with a clutch element 324, freely rotatable on a shaft 326 but held axially immovable thereon by collars 328. Shaft 326 may be suitably drivingly connected with shaft 262, for instance. Cooperating with the clutch element 324 is a companion element 330 which is splined at 332 to the shaft 326 and shiftable thereon to and from driving engagement with the element 324 by means of a shifter fork 334, pivotally mounted at 336 and connected by a link 338 with the core 340 of a solenoid 342. The shifter fork 334 is normally urged into the clutch-disengaging position shown in Fig. 12 by means of a spring 344, and is turned into clutch-engaging position on energization of the solenoid 342. Hence, the power drive for the feed roll 310 is operative only when the solenoid 342 is energized. The circuit for the solenoid 342 comprises the power line 282, a lead 346, the winding of solenoid 342, a lead 348, a normally open snap switch 350, and a lead 352. The cam disk 298 is also provided with a peripheral cam lug 354 which is so coordinated with the gap 304 in the cam track 306 as to engage the actuating blade 356 of switch 350 and close the latter immediately after the cam disk 298 starts on its single revolution in an operating cycle of the apparatus, whereby the feed roll 310 is preferably so angularly disposed at the beginning of the cycle that it will not cooperate with the companion roll 312 and feed the supply band 46 until the portion thereof at the exposure station X is exposed. The cam lug 354 is preferably of an angular extent to maintain switch 350 closed for the requisite number of intermittent feeding steps of the supply band 46 during an operating cycle of the apparatus, whereupon the circuit of the solenoid 342 is opened for the remainder of the cycle during which the continuous feed for the severed strip 92 remains operative.

It will be understood that various changes in the details of construction and the arrangement of parts may be made without departing from the underlying idea or principles of this invention within the scope of the appended claims.

Having thus described my invention, what I claim and desire to secure by Letters Patent is:

1. In photographic apparatus, a basin for containing a supply of water, a series of tandem-arranged tanks in said basin projecting above the water level therein and containing different chemical solutions, respectively, for developing and re-developing an exposed sensitized photographic strip, certain consecutive tanks being spaced from each other, a track for guiding an exposed strip successively to said tanks and into and from the respective solutions therein, means for feeding an exposed strip through said track, means below said track for spraying water from said supply upwardly into a track portion between spaced consecutive tanks, and waterproof lighting means immersed in the water supply in said basin between spaced consecutive tanks for re-exposing an exposed strip in said track, said track being open on one side to bare the sensitized face of a strip therein to said spraying means and lighting means while passing through the track.

2. An installation for developing and re-developing an exposed sensitized photographic strip comprising, a basin for containing a supply of water, a series of tandem-arranged spaced tanks in said basin projecting above the water level therein and containing different chemical solutions, respectively, for treating an exposed strip, a continuous track for guiding an exposed strip successively to said tanks and into and from immersion in the respective solutions therein, the track portions outside said tanks being above the level of said water supply and open to the latter, means for feeding an exposed strip through said track with the exposed sensitized face thereof bared to the water supply at said open track portions, means below said track portions and between all consecutive tanks for spraying water from said supply into said open track portions, and waterproof lighting means immersed in the water supply in said basin between certain consecutive tanks and below one of said track portions for re-exposing an exposed strip in said track.

FREDERICK D. SINGER.

REFERENCES CITED

The following references are of record in the file of this patent:

UNITED STATES PATENTS

| Number | Name | Date |
|---|---|---|
| 1,344,896 | Jobke | June 29, 1920 |
| 1,361,555 | Weiss | Dec. 7, 1920 |
| 1,410,884 | Brewster | Mar. 28, 1922 |
| 1,590,796 | Banks | June 29, 1926 |
| 1,762,936 | Seymour | June 10, 1930 |
| 1,846,571 | Rochestie | Feb. 23, 1932 |
| 2,102,585 | Brunk | Dec. 21, 1937 |
| 2,117,279 | Anson | May 17, 1938 |
| 2,265,975 | Lloyd | Dec. 9, 1941 |
| 2,337,989 | Grant | Dec. 28, 1943 |
| 2,385,681 | Brick | Sept. 25, 1945 |
| 2,386,781 | Daly | Oct. 16, 1945 |
| 2,401,185 | Pratt | May 28, 1946 |
| 2,419,853 | Pask | Apr. 29, 1947 |